No. 635,024. Patented Oct. 17, 1899.
M. T. REEVES, J. N. KAILOR & H. C. CLAY.
GEAR CASING.
(Application filed Feb. 27, 1899.)
(No Model.)
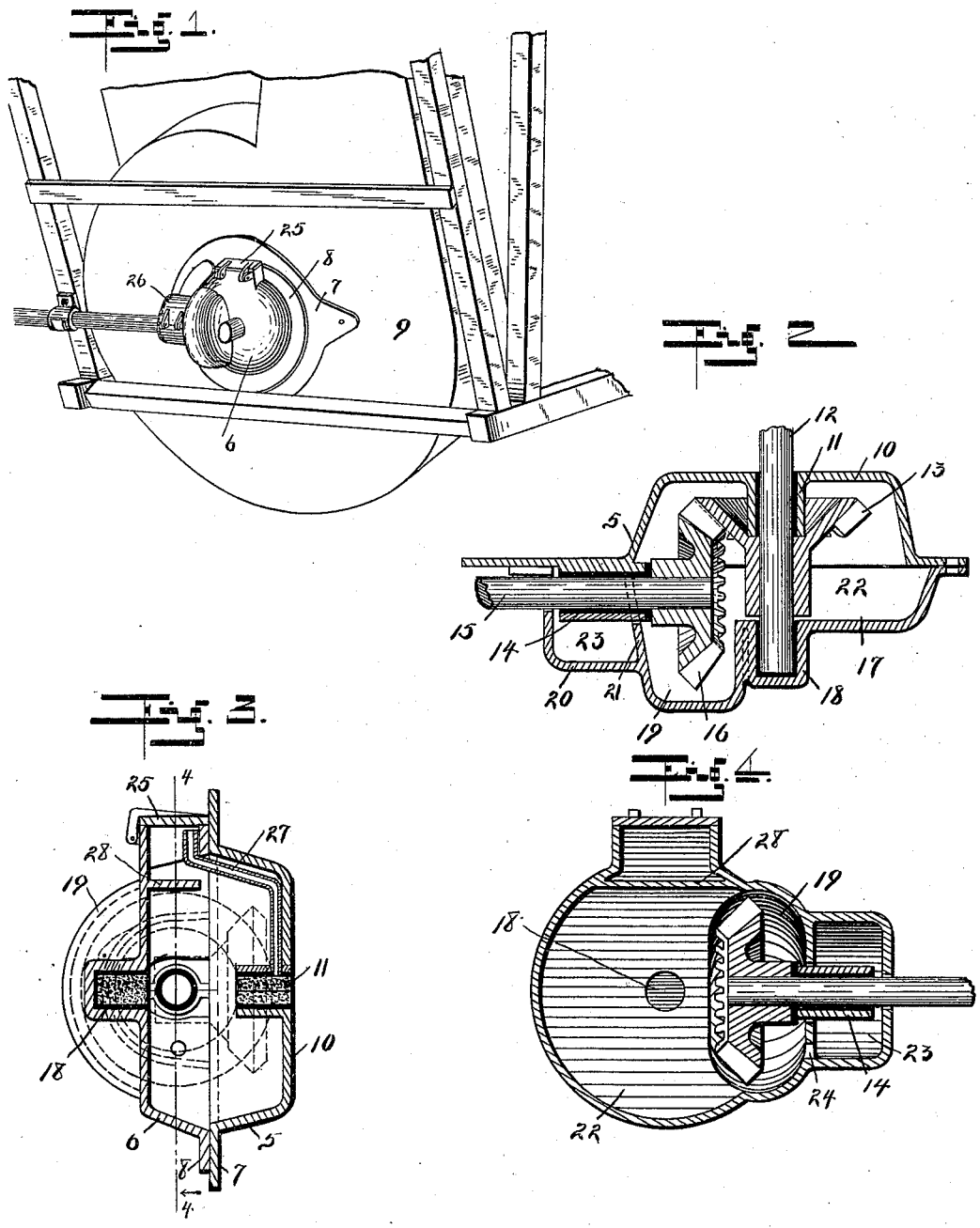
WITNESSES:
Frank A. Fable
C. M. Hood
INVENTORS.
MARSHAL T. REEVES
JOHN N. KAILOR.
HARRY C. CLAY.
BY
Arthur M. Hood
ATTORNEY.
THE NORRIS PETERS CO., PHOTO-LITHO., WASHINGTON, D. C.

UNITED STATES PATENT OFFICE.

MARSHAL T. REEVES, JOHN N. KAILOR, AND HARRY C. CLAY, OF COLUMBUS, INDIANA, ASSIGNORS TO THE REEVES & COMPANY, OF SAME PLACE.

GEAR-CASING.

SPECIFICATION forming part of Letters Patent No. 635,024, dated October 17, 1899.

Original application filed January 21, 1898, Serial No. 667,441. Divided and this application filed February 27, 1899. Serial No. 706,969. (No model.)

*To all whom it may concern:*

Be it known that we, MARSHAL T. REEVES, JOHN N. KAILOR, and HARRY C. CLAY, citizens of the United States, residing at Columbus, in the county of Bartholomew and State of Indiana, have invented a new and useful Gear-Casing, of which the following is a specification.

Our invention relates to an improvement in gear-casings, and the present application is a division of our original application for patent for a pneumatic stacker filed January 21, 1898, Serial No. 667,441.

The object of our invention is to provide an improved form of casing for gears, particularly of the gears used for driving the fan of a pneumatic stacker.

The accompanying drawings illustrate our invention.

Figure 1 is a perspective view showing the gear-casing in position on the fan-casing. Fig. 2 is a horizontal section through the center of the driving and fan shafts. Fig. 3 is a vertical section. Fig. 4 is a section on line 4 4 of Fig. 3.

The casing consists of two registering sections 5 and 6, provided with flanges 7 and 8, respectively, by means of which they may be bolted together and to the fan-casing 9. Section 5 is provided with a cup-shaped portion 10, having a bearing 11, arranged to receive fan-shaft 12, a gear 13 being mounted on said shaft within the portion 10. Another bearing 14 is also carried by section 5 in position to receive the driving-shaft 15, to the inner end of which is secured a gear 16, arranged to mesh with gear 13. For convenience the bearings 11 and 14 should be capped bearings of any desired form. Section 6 is provided with a cup-shaped portion 17, which is adapted to register with portion 10 of section 5, and in this portion 17 is carried a step-bearing 18, arranged to receive the end of the fan-shaft 12. Section 6 is also provided with a recess 19, within which gear 16 may revolve. The wall of section 6 is extended, as at 20, so as to entirely inclose the bearing 14. A wall 21 is extended from the side of recess 19 until it meets the face of section 5, said wall fitting around shaft 15 or its bearing, and thus forming two chambers 22 and 23, the bearing 14 being located in chamber 23. The bottom of chamber 23 is lower than the bottom of chamber 22, and a small opening 24 is formed through wall 21 at the bottom of chamber 23, so as to allow any oil which may pass into chamber 23 to return to chamber 22.

For convenience in examining the bearings a door 25 leads into chamber 22, and a door 26 leads into chamber 23, both doors being preferably hinged upon section 6. In order that bearing 11 may be easily oiled, a pipe 27 is provided, said pipe leading from the opening closed by door 25 to said bearing. In order to prevent oil from being thrown out by the gears through the opening closed by door 25, a guard 28 is carried by section 6.

In use enough oil is placed in chamber 22 to come up into contact with the gears. Wall 21 prevents any great amount of oil from working out along bearing 14. Any surplus oil in bearing 14 will drop to the bottom of chamber 23 and return through opening 24 to chamber 22.

By this construction the gears may be continually flooded with oil, which is nevertheless retained within the casing, and the gears and bearings are thoroughly protected from dust and dirt.

We claim as our invention—

1. A gear-casing consisting of the following elements; a cup-shaped section carrying a pair of shaft-bearings one at an angle to the other, and a registering section arranged to inclose and cover both of said bearings and to form with the first section a chamber for the reception of a pair of meshing gears the arrangement being such that the cover-section may be removed without disturbing the bearings.

2. A gear-casing consisting of the following elements; a cup-shaped section carrying a pair of shaft-bearings one at an angle to the other, a registering section arranged to inclose both of said bearings and to form with the first section a chamber for the reception of a pair of meshing gears, and a step-bearing carried by said second section in line with one of the bearings carried by the first section.

3. A gear-casing consisting of the following elements; a cup-shaped section carrying a pair of shaft-bearings one at an angle to the other, a registering section arranged to inclose both of said bearings and to form with the first section a chamber for the reception of a pair of meshing gears, and an intermediate wall separating the gear-chamber from the chamber containing one of said bearings the said registering section being removable without disturbing the bearings.

4. A gear-casing consisting of the following elements; a cup-shaped section carrying a pair of shaft-bearings one at an angle to the other, a registering section arranged to inclose both of said bearings and to form with the first section a chamber for the reception of a pair of meshing gears, an intermediate wall separating the gear-chamber from the chamber containing one of said bearings, and a step-bearing carried by the second section in line with the other bearing of the first section.

5. A gear-casing consisting of a section 5 having bearings 11 and 14 one at an angle to the other, and section 6 forming, with section 5, a gear-receiving chamber 22 and bearing-chamber 23, and a wall 21 separating said chambers.

6. A gear-casing consisting of a section 5 having bearings 11 and 14 one at an angle to the other, a section 6 having a wall 21 forming, with section 5, a gear-receiving chamber 22 and a bearing-chamber 23, doors 25 and 26 furnishing access to said chambers, guard 28, and conduit 27.

7. A gear-casing consisting of a section 5 having bearings 11 and 14 one at an angle to the other, a section 6 having a wall 21 forming, with section 5, a gear-receiving chamber 22 and a bearing-chamber 23, doors 25 and 26 furnishing access to said chambers, guard 28, conduit 27, and bearing 18 carried by section 6.

MARSHAL T. REEVES.
JOHN N. KAILOR.
HARRY C. CLAY.

Witnesses:
HARRY O. WAY,
H. G. SCHOWE.